United States Patent
Bondarenko et al.

(10) Patent No.: US 12,488,889 B2
(45) Date of Patent: Dec. 2, 2025

(54) SYSTEMS AND METHODS FOR MONITORING SHARPS LEVELS IN SECURED SHARPS CONTAINERS

(71) Applicant: Smart Wave Technologies, Inc., Toronto (CA)

(72) Inventors: Volodimir Bondarenko, Toronto (CA); Sean Bellinger, Mounds View, MN (US); Clemente Receno, Toronto (CA); Dan Gabbay, Toronto (CA); Alejandro Cabrera, Toronto (CA); Mookwan Kang, Toronto (CA)

(73) Assignee: Smart Wave Technologies, Inc., Toronto (CA)

( * ) Notice: Subject to any disclaimer, the term of this patent is extended or adjusted under 35 U.S.C. 154(b) by 0 days.

(21) Appl. No.: 18/003,633

(22) PCT Filed: Aug. 5, 2022

(86) PCT No.: PCT/CA2022/051197
§ 371 (c)(1),
(2) Date: Dec. 28, 2022

(87) PCT Pub. No.: WO2023/019347
PCT Pub. Date: Feb. 23, 2023

(65) Prior Publication Data
US 2024/0105330 A1  Mar. 28, 2024

Related U.S. Application Data

(60) Provisional application No. 63/235,533, filed on Aug. 20, 2021.

(51) Int. Cl.
*G16H 40/67* (2018.01)
*G16H 40/20* (2018.01)

(52) U.S. Cl.
CPC ............ *G16H 40/67* (2018.01); *G16H 40/20* (2018.01)

(58) Field of Classification Search
CPC ...... G16H 40/67; G16H 40/20; G01F 23/284; G01F 23/292; G01F 23/2962;
(Continued)

(56) References Cited

U.S. PATENT DOCUMENTS

| 5,918,739 A | 7/1999 | Bilof et al. |
| 8,813,986 B2 | 8/2014 | Liscio et al. |

(Continued)

FOREIGN PATENT DOCUMENTS

| AU | 2006213947 A1 | 4/2007 |
| CN | 204064380 U | 12/2014 |

(Continued)

OTHER PUBLICATIONS

Canadian Patent Office, International Search Report and Written Opinion issued in PCT/CA2022/051197 dated Nov. 18, 2022.
(Continued)

*Primary Examiner* — Md M Rahman
(74) *Attorney, Agent, or Firm* — Wood Herron & Evans LLP

(57) ABSTRACT

Systems and methods for measuring the fill level of sharps in sharps containers are described. The system includes sensors for detecting a fill level in a sharps container and communications systems for reporting a sharps container fill status to local personnel through portable computing devices and central monitoring systems. The systems and methods are designed to improve deployment and collection of the sharps containers and their contents.

22 Claims, 13 Drawing Sheets

(58) Field of Classification Search
CPC .......... A61B 2090/0805; A61B 50/362; A61B 17/3217; A61M 5/3205; H04W 4/38
USPC ........................................................ 356/51
See application file for complete search history.

(56) References Cited

U.S. PATENT DOCUMENTS

| | | | |
|---|---|---|---|
| 10,524,873 | B2 | 1/2020 | Säll et al. |
| 11,011,268 | B2 | 5/2021 | Kelkar et al. |
| 2007/0080223 | A1 | 4/2007 | Japuntich |
| 2007/0278140 | A1 | 12/2007 | Mallett et al. |
| 2013/0078977 | A1* | 3/2013 | Anderson .............. H04B 1/036 455/418 |
| 2020/0166892 | A1 | 5/2020 | Chevallier et al. |

FOREIGN PATENT DOCUMENTS

| | | | | |
|---|---|---|---|---|
| EP | 3372188 | A1 | 9/2018 | |
| EP | 3461520 | A1 | 4/2019 | |
| FR | 3096668 | A1 | 12/2020 | |
| GB | 2513108 | A | 10/2014 | |
| WO | WO-2017035474 | A1 * | 3/2017 | ............. A61B 50/36 |
| WO | 2017143465 | A1 | 8/2017 | |
| WO | 2020135916 | A1 | 7/2020 | |
| WO | 2021081019 | A1 | 4/2021 | |

OTHER PUBLICATIONS

European Patent Office, Extended Search Report issued in EP22857169.1 dated Nov. 11, 2024.

* cited by examiner

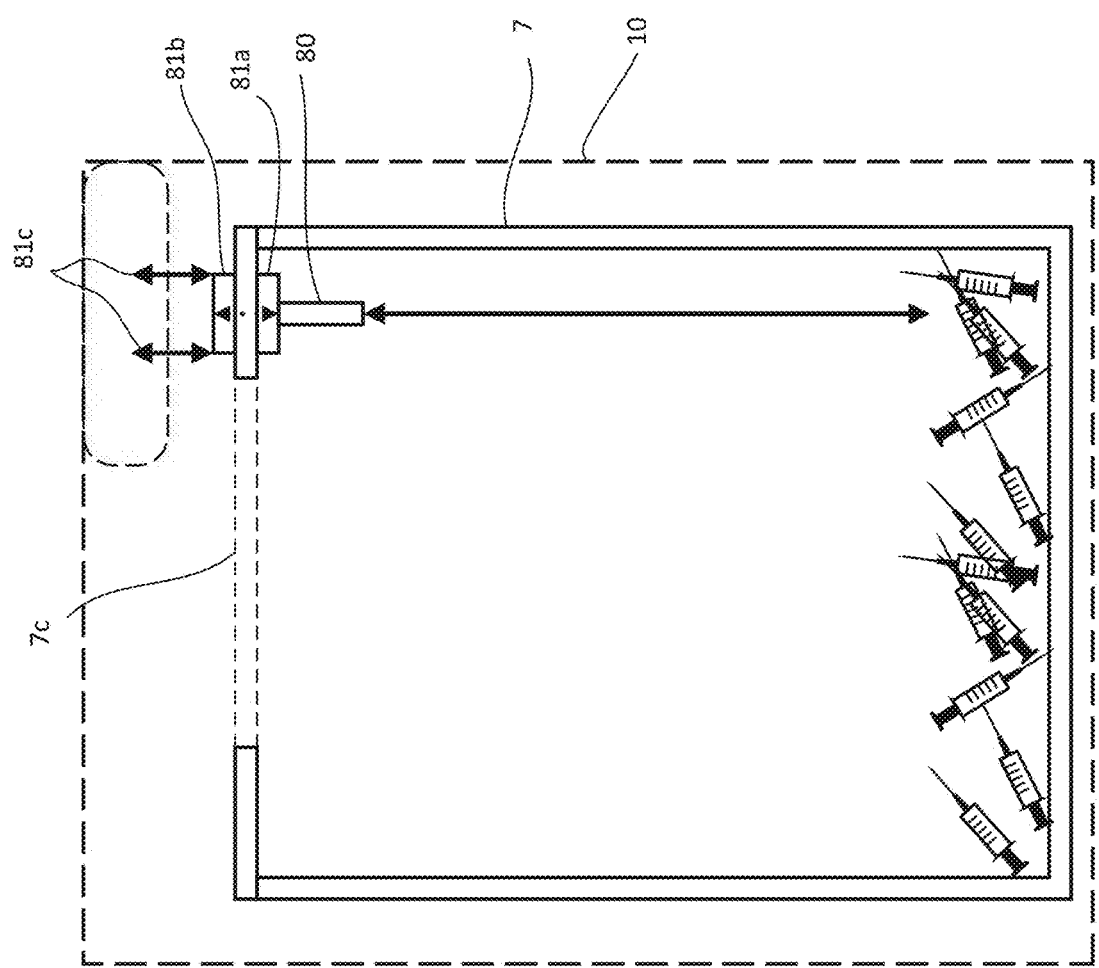

SYSTEMS AND METHODS FOR MONITORING SHARPS LEVELS IN SECURED SHARPS CONTAINERS

FIELD OF THE INVENTION

Systems and methods for measuring the fill level of sharps in sharps containers are described. The system includes sensors for detecting a fill level in a sharps container and communications systems for reporting a sharps container fill status to local personnel through portable computing devices and central monitoring systems. The systems and methods are designed to improve deployment and collection of the sharps containers and their contents.

BACKGROUND OF THE INVENTION

In the medical industry, large quantities of sharps waste are created each day. Generally, sharps include medical devices such as a needles, scalpels and other devices that are used to puncture or cut the skin. As is known, sharps are mainly used in hospitals, medical clinics, other medical settings, and private homes but are also used in various public areas where intravenous drug use may be prevalent. Sharps are a significant hazard to medical personnel, household members and the public from the risk of accidentally puncturing/cutting skin and in particular, the risks associated with used sharps that are no longer sterile and/or have been contaminated with another person's blood.

The Center for Disease Control (CDC) estimates that 385,000 health care workers experience needlestick/sharps injuries each year.

While there is a risk of mishandling unused and packaged sharps, the greatest risk is after use; hence, approved disposal bins must be provided and strict procedures must be followed wherever possible to minimize the risk of accidental cuts/punctures from used sharps. This includes all medical facilities and homes and also public spaces such as restrooms where needle disposal equipment is provided. In the United States, the disposal of sharps is regulated by the Needlestick Prevention Act (NSPA) which grants authority to levy significant fines to facilities/organizations that do not comply with the approved disposal protocols. Under the legislation, compliance requires the deployment and timely and safe removal of approved sharps containers when pre-determined fill levels have been reached to avoid overfilled containers.

Used sharps are properly disposed of in approved bins that have specific safety features to minimize risks to all users. Generally, an approved sharps container (SC) is a hard plastic bin designed for use in a treatment room, a person's private home or in a public space. The typical sharps container has a hard plastic body and lid that are secured together and are usually secured to a surface such as a wall or other immovable surface. The body and lid are designed such that they can only be disconnected from another and/or the SC removed from a mounting surface by authorized personnel with specialized equipment.

The lid typically has a small opening allowing a used sharp to be dropped into the body and that is small enough to prevent a hand to be inserted into the bin. The container may have various features that further prevent fingers from being pushed in and/or various mechanisms to prevent used sharps from being removed.

Smaller units designed for use in a person's home may not be secured to a wall.

Under the NSPC legislation, to ensure that sharps containers are not a hazard to all users, they must be emptied before becoming too full. Importantly, puncture risk rises quickly if a container is full and a user is attempting to dispose of a sharp in a container where the upper surface of used sharps is close to the opening.

As such, medical centers will follow various procedures to ensure proper handling as required under the legislation. Such procedures can include regular inspection by dedicated personnel and if a container is determined to be past a threshold level, it is removed and replaced with a new empty one. Other practices include users noticing that a container is full and specifically calling for the removal/replacement of the full container. Regardless of the processes followed, there are inefficiencies in these processes. For regularly scheduled inspections, containers may not be full resulting in a partially full container being serviced when it is not required, or a container may be full and servicing should have been conducted earlier. Further still, institutions typically have complex procedures that includes manual paperwork as proof of service and to ensure proper compliance/record keeping as is required.

Another consideration in large treatment centers is the intrusiveness of the servicing of a SC. That is, as containers are in treatment rooms, servicing personnel should be respectful of patient privacy when servicing a container which can lead to further inefficiencies in gaining access to treatment rooms if they are in use.

In large institutions such as hospitals, there may be thousands of containers distributed throughout the hospital with thousands of sharps being disposed of each day. Wall mounted containers are the most common.

The determination of appropriate sizes of containers in different areas will be determined based on trial and error learning over time where it may be learnt that in some areas, smaller containers need to be replaced more frequently and other containers do not require replacing for long periods of time. Whether hospital staff or service companies look after the servicing there will be a lag between noticing a problem and making adjustments to correct any problems.

Automatic measurement of the level of sharps in containers has been contemplated and various sensors have been incorporated into sharps containers. While electronic measurements are helpful in alerting staff that a container is becoming full, numerous inefficiencies remain in the deployment of large-scale sharps containers across a wide area network.

In many instances, the cost of changing current systems in hospitals is prohibitive as new containers can require significant upfront investment in the containers themselves but also changes to the associated mechanisms for mounting and/or chain-of-custody equipment. Cleaning/sterilization procedures of emptied containers must be adapted to ensure protection of electronics/sensors.

Further still, inefficiencies have become more pronounced in the Covid world as movements of personnel within hospitals have been restricted.

As a result, there has been a need for systems that provide various combinations of the following:

Sense the level of sharps at regular intervals (e.g. daily) in multiple containers across both local and wide area networks for local and back-end personnel to interact with the systems.

Report the level to a central tracking system that analyzes fill-status data of multiple containers to facilitate local decision making and enable efficient proof-of-service.

Calculate rate-of-fill of containers and projected date to reach a target fill level (e.g. 80%).

Plan pick-up schedules and routes based on projected target fill level and fill rates.

Provide enhanced security to containers to detect, log and report unauthorized movement events.

Improve service accounting by providing an audit trail of container activity.

Improve security and chain-of-custody reporting.

Enable faster adjustments to customers' changing needs.

Display fill levels on the exterior of containers.

Lower costs to hospitals/service companies by maximizing load and route efficiencies.

SUMMARY OF THE INVENTION

In accordance with the invention, systems and methods for improving the efficiency of servicing sharps containers are described.

In a first aspect, a system for monitoring a fill level of a sharps container (SC) and reporting fill level data to a computer system is provided, the system including: a sharps monitor (SM), the SM having a body configured to hold and secure the SC within the body, the body having side walls supporting an emitter/receiver pair including: an emitter for emitting light through the first side wall of the sharps container; a receiver for receiving light through the second side wall of the sharps container; a processor and memory configured to the body for receiving and storing fill status data from the receiver; and a communication system connected to the processor and memory for communicating fill data to a computer system over a wireless communication network.

In various embodiments:

the emitter is an 900-950 nm LED.

the emitter/receiver pair comprise an emitter housing supporting the emitter and a receiver housing supporting the receiver and where the receiver is recessed within the receiver housing to partially shield the receiver from ambient light.

the emitter and receiver housings contact the sharps container when a sharps container is mounted in the body.

the processor is configured to initially activate the receiver to obtain an ambient light reading and subsequently activating the emitter and receiver to take a fill level reading and based on a difference between the ambient light reading and fill level reading determines if an emitted signal from the emitter is blocked or unblocked.

the communication system is configured for local area network communication with a portable computing device (PCD) and the processor advertises a device presence to initiate communication and data reporting from the device to the PCD.

the SC has a code configured to the SC and where the code is only visible to a user upon separation of the SC from the device.

the system includes a portable computing device (PCD) and where the processor reports to the PCD a combination of fill status data and device location data.

the PCD is configured with application software configured to wirelessly connect to the SM and receive fill status data and device location data.

the application software is configured to display fill status data of the SC and display if the SC requires servicing or not based on reported fill status data.

the application software is configured to receive the code from a full SC upon separation of the full SC from the SM.

the application software is configured to receive a code on an empty SC prior to connecting the empty SC to the SM.

the application software is configured to receive SM battery status data from the SM and prompt to replace a SM battery if a battery level is below a pre-determined threshold.

the SM includes a first emitter/receiver pair configured to read an 80% fill level of an SC and a second emitter/receiver pair configured to read a 50% fill level of the SC.

the application software is configured to display a maximum time status and where the maximum time status is one of maximum time status not exceeded or maximum time status is exceeded.

the communication system includes a wide area network communication system for wireless connecting the SM to a wide area network and where the system further comprises a central computer system (CCS) configured with CCS application software to receive fill status data and location data directly from a SM.

the PCD displays a map of a facility and nearby SMs based on a distance threshold between a SM and PCD.

In another aspect, the a method of obtaining and reporting fill status data from a plurality of sharps containers (SC) in a location is provided, the SCs configured for wide area network communication with a central computer system (CCS), the method including the steps of: a) reporting fill status data from one or more SCs at the location to the CCS; b) deriving a location service report for the location based on a fill status of each SC at the location where each SC is marked as requiring service or not requiring service based on a reported fill status; and c) delivering the location service report to a portable communication device carried by a user where the location service report includes location specific information for each SC requiring service at the location.

In one embodiment, the method includes the step of deriving a recommended service order for two or more SCs marked as requiring service at a location based on a minimum distance between SCs at a location and displaying the recommended service order to the user.

In another aspect, a system for monitoring a fill level of a sharps container (SC) having first and second side walls and for reporting fill level data to a computer system is provided, the system including: a sharps monitor (SM), the SM having a body configured to hold and secure the SC within the body, the body having side walls; a time-of-flight sensor configured to the SM or SC having a line-of-sight towards an inside bottom surface of the SC for measuring a fill level of sharps within the SC; a processor and memory configured to the body for receiving and storing fill status data from the receiver; and, a communication system connected to the processor and memory for communicating fill data to a computer system over a wireless communication network.

In one embodiment, the time of flight sensor is connected to an interior of the SC and is removeable from the SC for cleaning the SC.

In another embodiment, the time of flight sensor is selectively connected to the SC and includes a power and data transmission system for transmitting power and data through the SC via an inductive power and data system.

In one embodiment, the power and data transmission system includes a first inside magnet and a second outside magnet and where the first and second magnets collectively secure the time of flight sensor within the SC.

DESCRIPTION OF THE DRAWINGS

The invention is described with reference to the drawings in which:

FIG. 9 is a diagram of a magnetically coupled time of flight sensor in accordance with one embodiment of the invention.

DETAILED DESCRIPTION OF THE INVENTION

Figure 1:
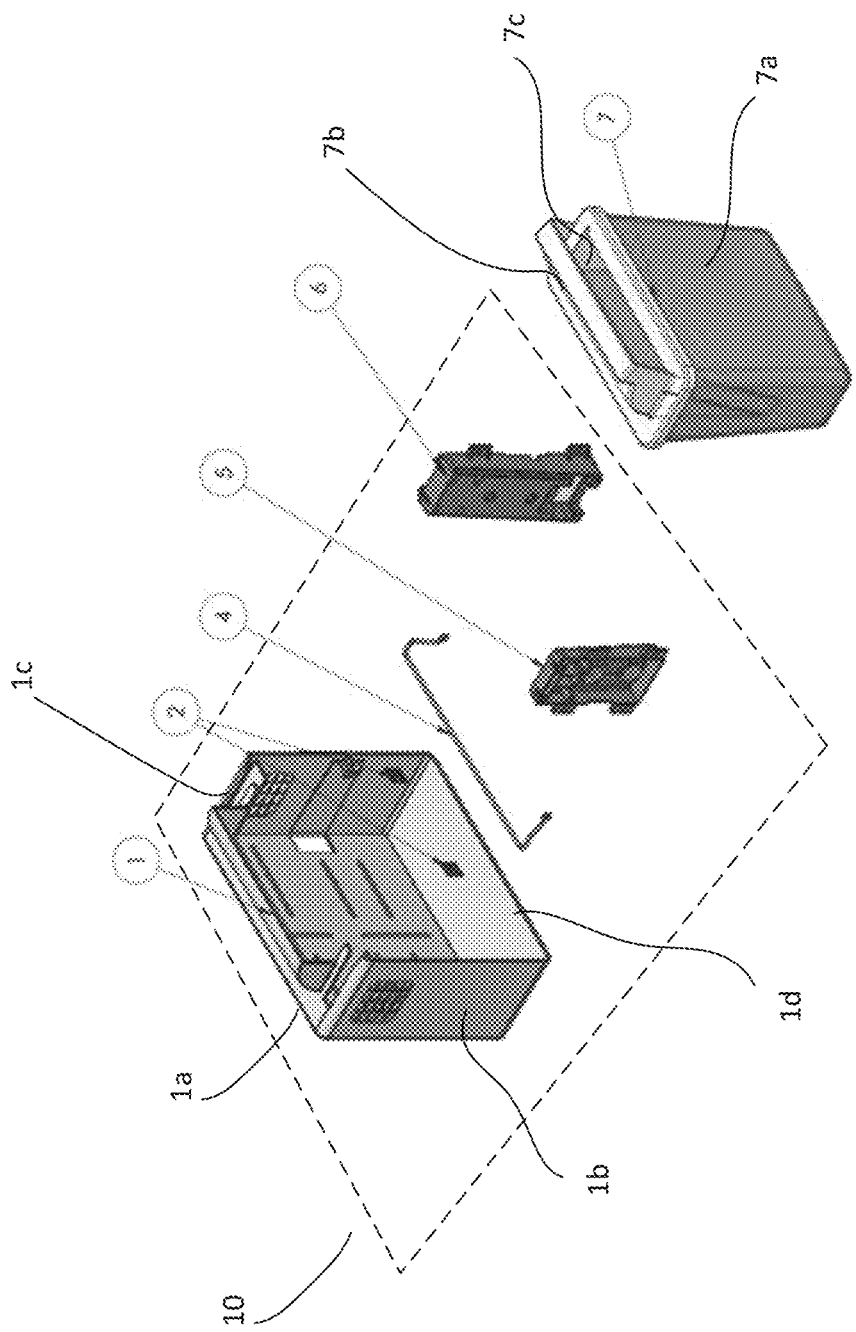
FIG. 1 is an exploded perspective view of a sharps monitoring system (SM) and sharps container (SC) in accordance with one embodiment of the invention.

With reference to the figures, systems and methods for improved sharps handling are described.

Rationale

The inventors understood that current systems and methods of monitoring the level of sharps in sharps containers had various limitations particularly around retrofitting monitoring sensors to existing sharps containers and efficiently collecting fill status data from existing sharps containers.

Terminology

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Spatially relative terms may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a feature in the figures is inverted, elements described as "under" or "beneath" other elements or features would then be oriented "over" the other elements or features. Thus, the exemplary term "under" can encompass both an orientation of over and under. A feature may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, etc., these elements, components, etc. should not be limited by these terms. These terms are only used to distinguish one element, component, etc. from another element, component. Thus, a "first" element, or component discussed herein could also be termed a "second" element or component without departing from the teachings of the present invention. In addition, the sequence of operations (or steps) is not limited to the order presented in the claims or figures unless specifically indicated otherwise.

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Unless otherwise defined, all technical and scientific terms used herein have the same meaning as commonly understood by one of ordinary skill in the art to which this invention belongs.

Various aspects of the invention will now be described with reference to the figures. The invention may, however, be embodied in many different forms and should not be construed as limited to the embodiments set forth herein; rather, these embodiments are provided so that this disclosure will be thorough and complete, and will fully convey the scope of the invention to those skilled in the art.

Moreover, the drawings are not necessarily drawn to scale and are intended to emphasize principles of operation rather than precise dimensions.

Overview

Figure 2:
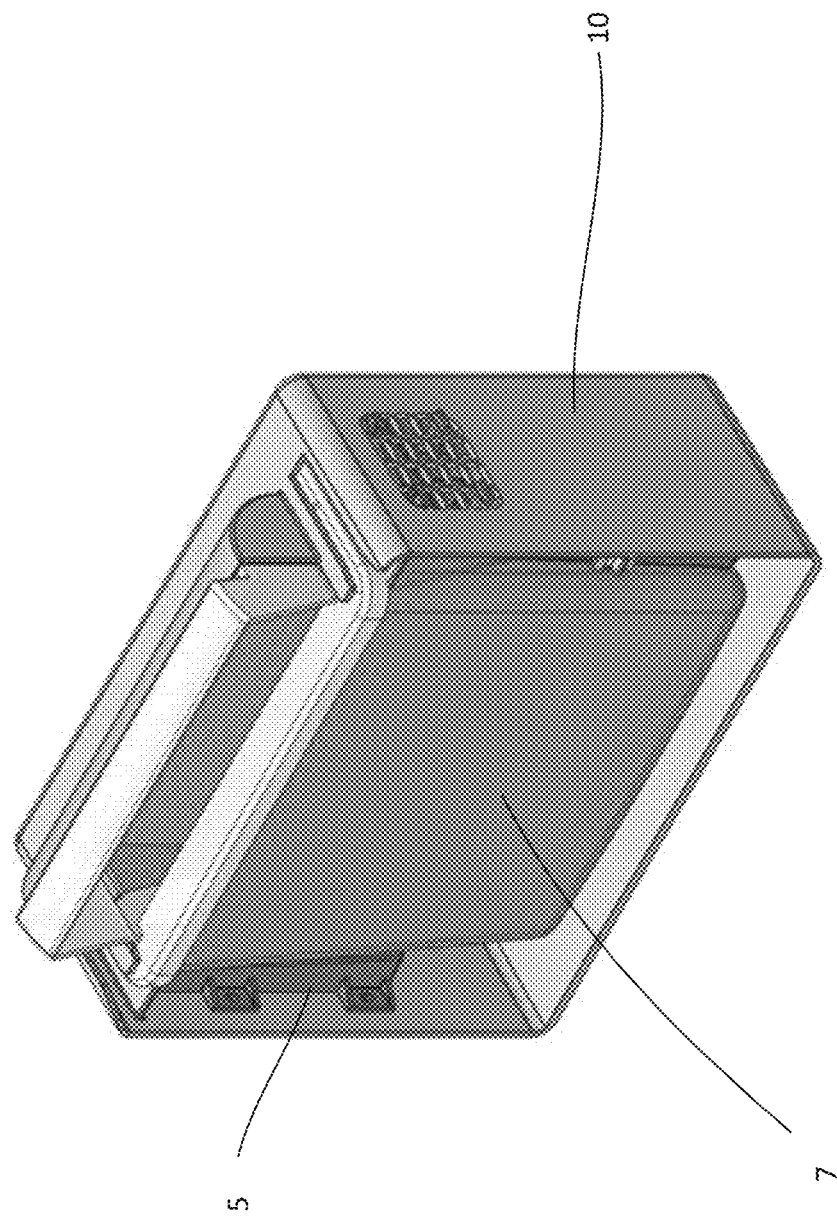
FIG. 2 is a perspective view of an assembled sharps monitoring system (SM) and sharps container (SC) in accordance with one embodiment of the invention.

FIG. 1 shows an exploded view of a sharps container measuring and reporting system 10 (referred to herein as a "sharps monitor" (SM)) configured to a sharps container (SC) 7 and FIG. 2 shows a sharps container (SC) 7 configured within a SM 10. A typical SC 7 includes a hard-plastic body 7a that is translucent to light/IR (typically yellow or red polyolefin plastic) that includes a lower bucket container 7a and an upper lid 7b with an opening 7c to allow used sharps to be dropped into the container.

In this description, the SM is generally described as being retrofit and secured to the SC around the lower bucket container while providing normal access to the disposal opening 7c.

Figure 3:
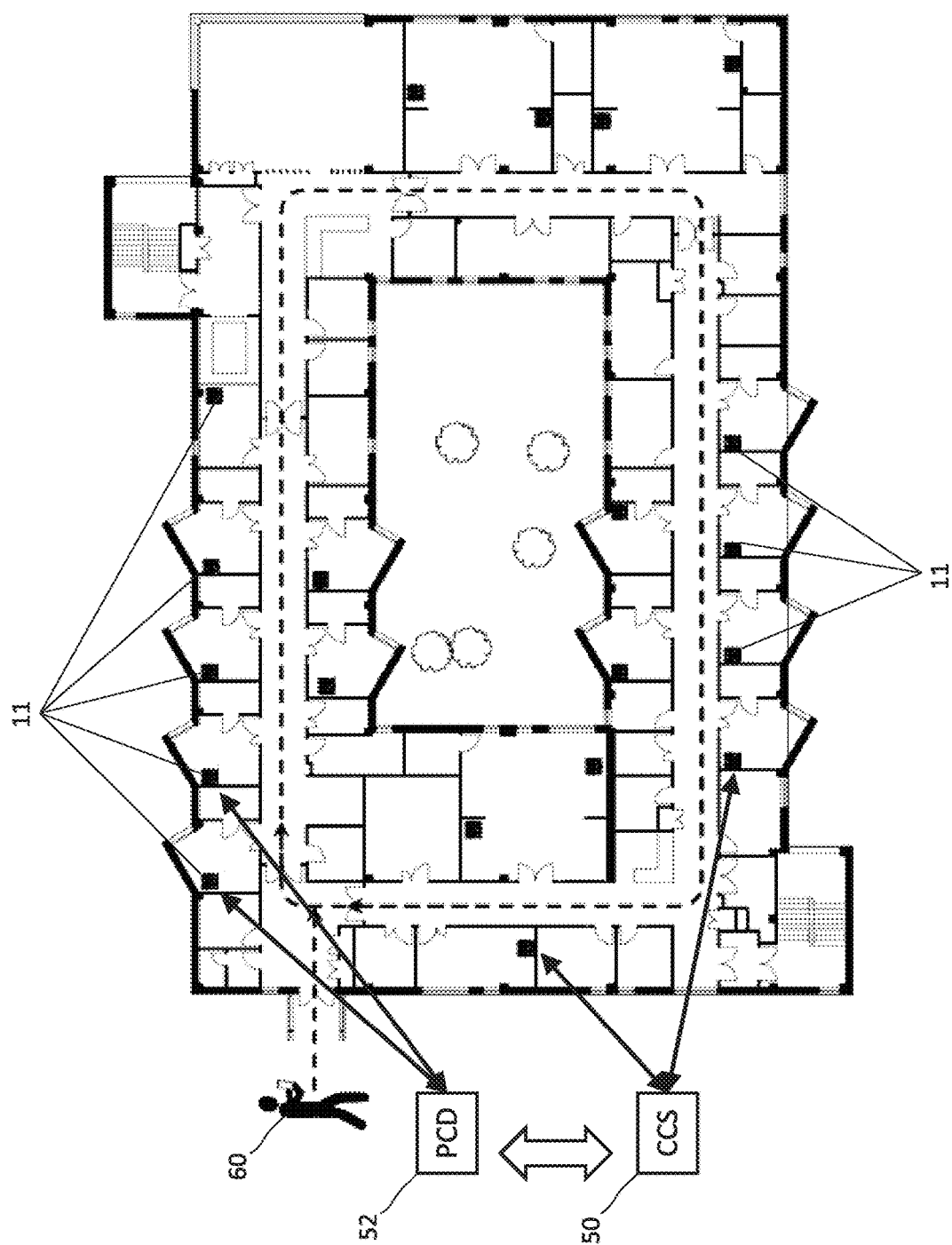
FIG. 3 is a plan view of a building floor where multiple SM/SC are deployed.
Figure 3A:
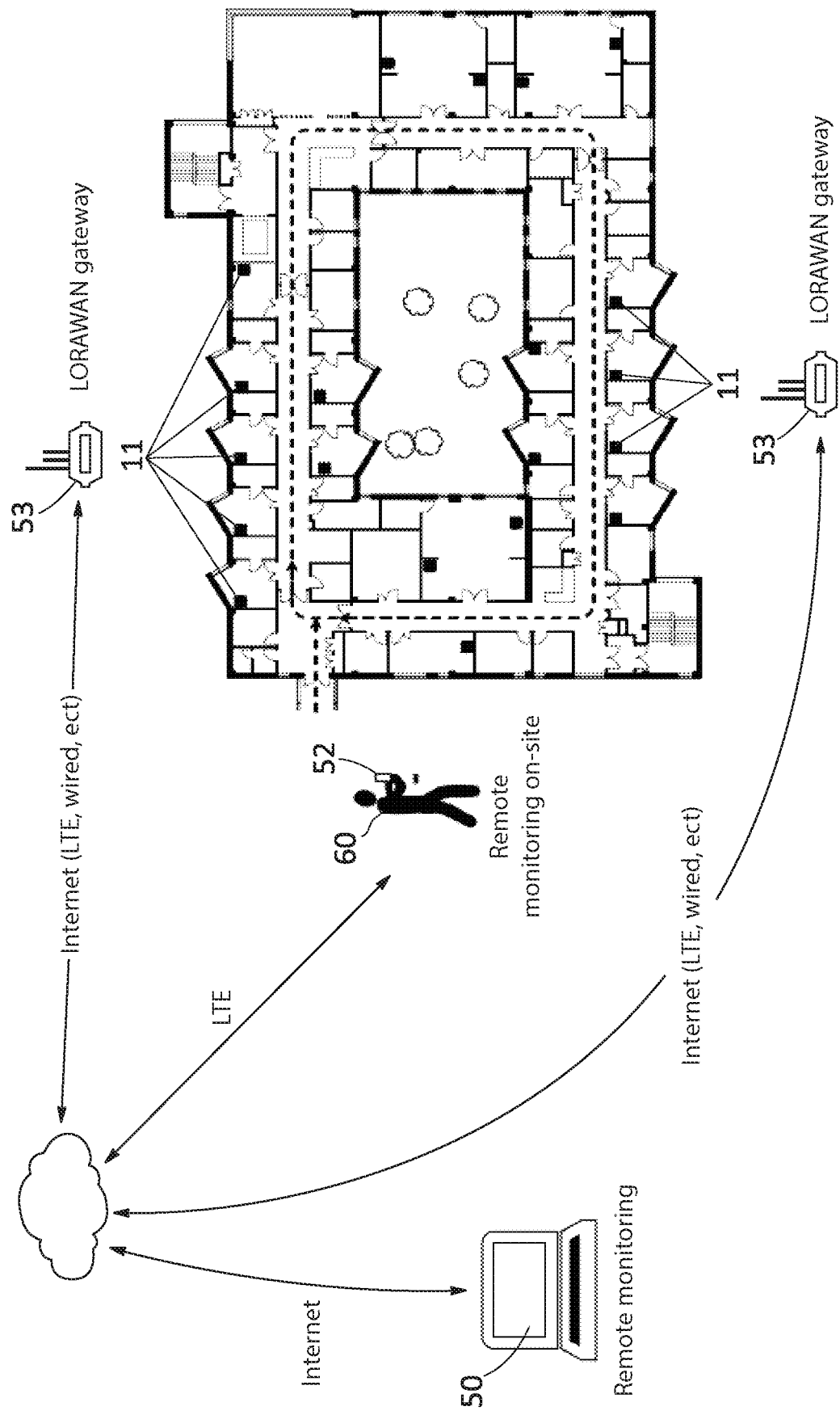
FIG. 3A is a view of a communications network in accordance with one embodiment of the invention.

As will be explained below, sharps levels within the container can be measured and reported to a central computer system 50. FIGS. 3 and 3A show a plurality of SM/SC assemblies 11 each with a SM 10 and SC 7, deployed within a typical medical facility where a number of rooms on a floor have been outfitted with SM/SC assemblies. In various embodiments, the SMs can communicate with either or both of a local and wide area network and preferably also with a portable/personal computing device (PCD) 52 that is carried by a user 60. For example, depending on the particular configuration and/or deployment scenario, a SM may communicate only with a central computer system (CCS) 50 via a wide area network (e.g. a cellular network), may communicate only with a local area network (e.g. various gateways and/or PCDs via WIFI and/or Bluetooth™) that in turn is connected to a wide area network that communicates with a central computer system or the SM may communicate with both a wide area network and local area network.

Generally, and depending on the particular configuration and/or deployment scenario, a user 60, carries a personal computing device (PCD) 52 that can receive relevant fill status data about SMs in its vicinity for the purpose of servicing SM/SCs inter alia. Such data may be received directly or indirectly from each SM.

FIG. 3 shows a deployment scenario where each SM can communicate with both a CCS and a nearby PCD. In this embodiment, a PCD may receive data directly from a nearby SM when the PCD is close enough to the SM to establish communication. The PCD may also receive data from the CCS. Each SM can communicate data directly to a CCS when a PCD is not in the vicinity.

FIG. 3A shows a deployment scenario where the system is configured with a low-power wide area network communication system such as LORAWAN enabling communication from a SM to a CCS directly or via various gateway communication routers 53. In this scenario, a PCD does not communicate directly with a nearby SM and only receives data from the CCS thus simplifying the communication system of each SM.

As shown in FIG. 1, the SM 10 generally includes a housing 1 that engages the bucket container 7a of the SC on at least two sides so as to position at least one emitter and receiver pair 5, 6 on opposite sides of the side walls of the bucket container at a level representing a maximum fill level (e.g. 80%) and in the case of two more emitter/receiver pairs, other desired fill levels (e.g. 50%).

If the SC is a typical six-sided bucket (i.e. a bottom, two vertical sides, a vertical front and back and a top (i.e. the lid)), the SM will at a minimum position an emitter/receiver pair on opposite sides of one pair of vertical parallel surfaces.

As shown in FIG. 1, the SM includes a back surface 1a that allows attachment of the SM to a wall such as an existing SC wall bracket and/or a bottom shelf surface 1c that provides a shelf for SC. In the embodiment shown, the SM is designed for attachment to a vertical wall via back surface 1a and does not include a front cover so as to enable existing labelling of the SC to be seen and to enable ready removal of the SC from the SM when being serviced. The SM may include appropriate brackets/clips 2 to hold the SC within the SM.

Figure 4:
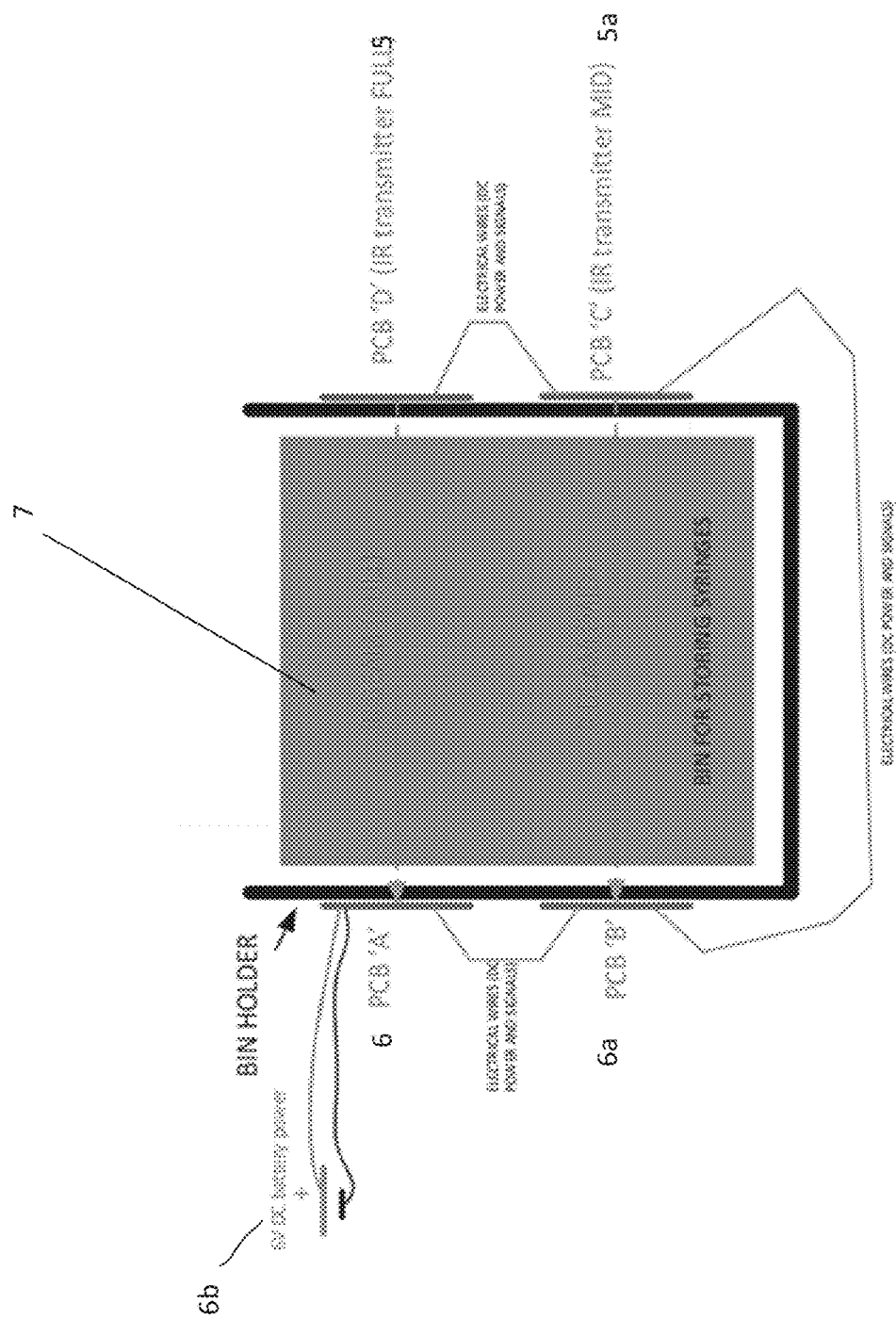
FIG. 4 is a schematic view of an assembled sharps monitoring system (SM) and sharps container (SC).

As shown schematically in FIG. 4 and in FIGS. 1-2, the SM is sized to bring at least one emitter/receiver pair 5,6 into close contact with the outside walls of the SC such that infra-red (IR) can be emitted and pass through the translucent surfaces of the SC. As such, when a SC is empty, IR from the emitter 5 passes through the wall of the SC, across its interior and through the opposite wall to the receiver 6.

If an IR signal is received at the receiver, it is not being blocked thus indicating that the fill level is below the threshold fill level. If the IR signal is blocked by sharps, the sharps level in the SC is at or above that fill level.

Figure 4A:
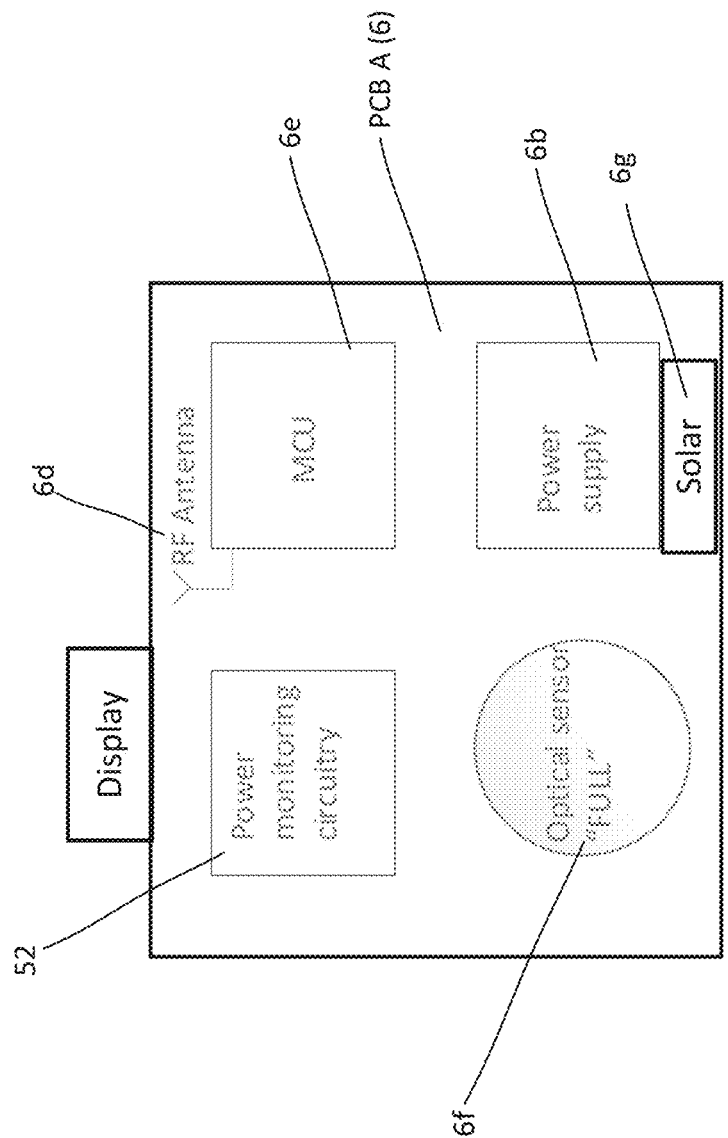
FIG. 4A is a schematic view of SM printed circuit board (PCB) in accordance with one embodiment of the invention.

In addition, one or more additional emitter/receiver pairs 5a,6a may be configured to the SC to measure other fill levels. Each emitter/receiver pair is configured to an appropriate printed circuit board (PCB) (see FIGS. 4 and 4A) and connected to a power supply 6b through appropriate wiring.

Generally, as explained in greater detail below, the plastic used to manufacture sharps container has IR transparency at various wavelengths allowing the emitter/receiver pair to be external to the SC.

Within the electronics, a communications system includes a microcontroller (MCU) 6e and antenna 6d that enables communication with one or more of a local and wide area network to report data measured within a SC to be reported to other computer systems including central computer systems and/or local handheld computer systems. In various embodiments, the system may be provided with a solar cell 6g that can charge the battery.

Measurement Circuit, Power Consumption and Adjustment for Ambient Light

As the system may be deployed in a variety of institutions/homes/public spaces and is designed to be retrofit to the exterior of a SC, variation in ambient light during operation is significant and can affect the accuracy of readings. Power consumption efficiency is generally preferred to support the accuracy and reliability of the system and minimize maintenance costs.

In one embodiment, the system is designed to ensure accuracy of measurements across a range of ambient light conditions (specifically the IR portion of ambient light) while also minimizing power consumption as described below.

Self-adjustment to ambient light conditions is conducted with independent control of the emitter and receiver that have been selected to filter out the normal visible light spectrum.

In one embodiment, at the time of taking a measurement reading, the receiver 6 is activated and read first to determine the IR portion of the ambient light without energizing the emitter 5. This sets a baseline for IR detection. The transmitter is then activated and the receiver read again immediately after to obtain a measurement reading. This sequence may be repeated several times to get an average signal.

Preferably a measurement sequence is conducted a small number (e.g. 1-4) of times per day to minimize power consumption.

By way of example, if the room is bright (e.g. a room with an outside window on a sunny day), the level of ambient IR could be higher than average. A measurement of this baseline will determine X digital units of ambient IR.

The emitter is then turned on and the measurement is conducted again. With the receiver designed to be operating in its linear or close to linear mode, the receiver will not be saturated by the ambient IR allowing detection of the additional IR from the emitter if the emitter signal is not being blocked by sharps.

If the difference D between the ambient IR baseline X and the measured signal Y with the emitter on is greater than a threshold, IR is passing through the container and is an unblocked signal. If D is less than a threshold, the IR beam is being blocked by the sharps.

Preferably, the analog signal measured at the receiver is amplified before analog to digital conversion by an amount sufficient to increase the difference between baseline and measured signals above a threshold value that clearly distinguishes between blocked and unblocked signals particularly in high ambient IR conditions where the proportional difference between ambient IR and ambient IR+signal is less.

Importantly, the effect of ambient IR can also be minimized by mechanical design of the receiver and specifically, by recessing the receiver within a housing such that the ambient IR received is reduced.

In one embodiment, if the ambient IR measured at the receiver is at one or more threshold levels, the emitter power is proportionally increased for the next measurement sequence.

Each approach will have limitations such as the maximum power of the IR device and the effects on power consumption of the battery. However, to the extent that the transmit signal duration can be small (i.e. a fraction of a milli-second) and the number of transmit signals per day is also low (e.g. in the range of 2 or 3 per day), low power consumption can be achieved by both approaches.

Figure 5:
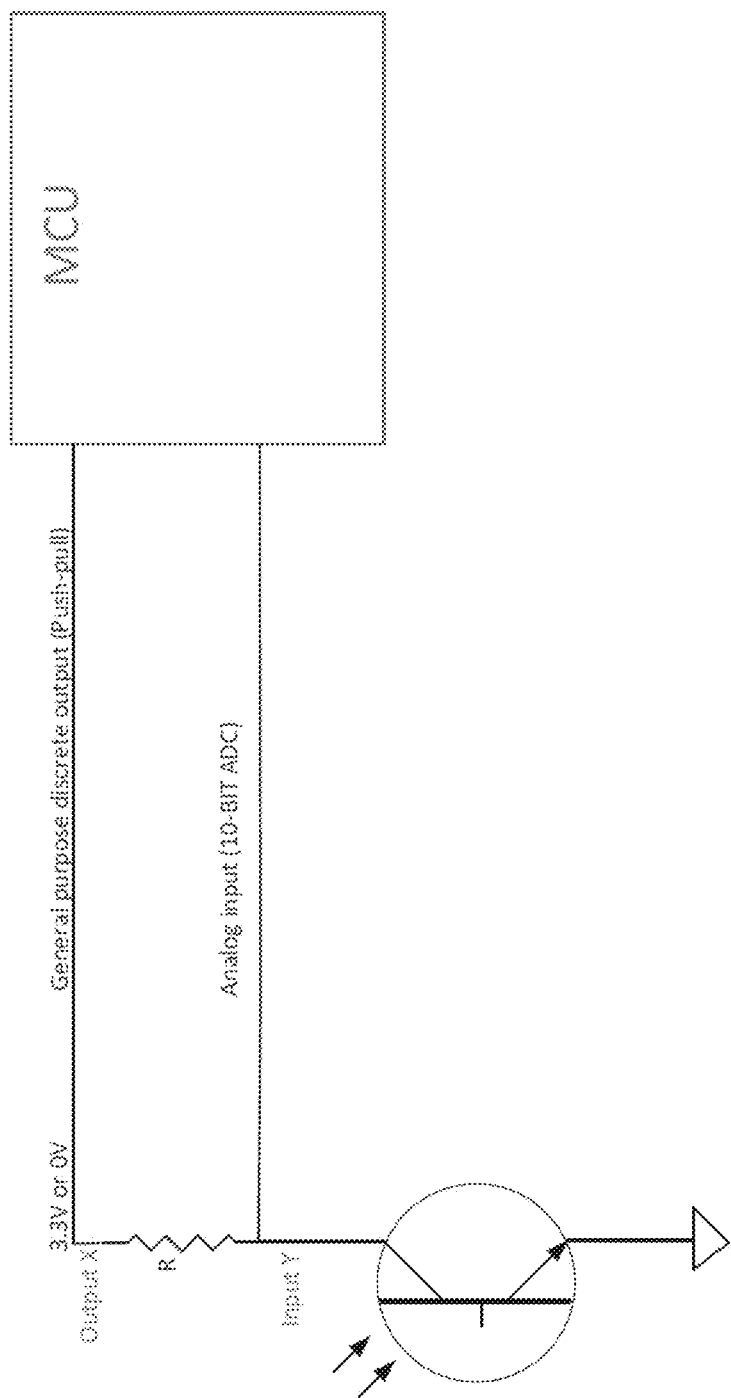
FIG. 5 is a schematic view of an optical receiver circuit in accordance with one embodiment of the invention.

As shown in FIG. 5, in one embodiment, the IR sensor operates as an IR controlled resistor where the higher the IR intensity, the more it is conductive resulting in a voltage drop across analog input Y. When there is low IR input, the analog input Y is high.

Preferably, a discrete output from the MCU is used to save power compared to connecting the resistor directly to power supply. When the IR sensor is not being used, the output X is driven to logic "0" (0V) thus the current through the sensor is zero. In some embodiments, a voltage controlled power switch can be used.

Figure 5A:
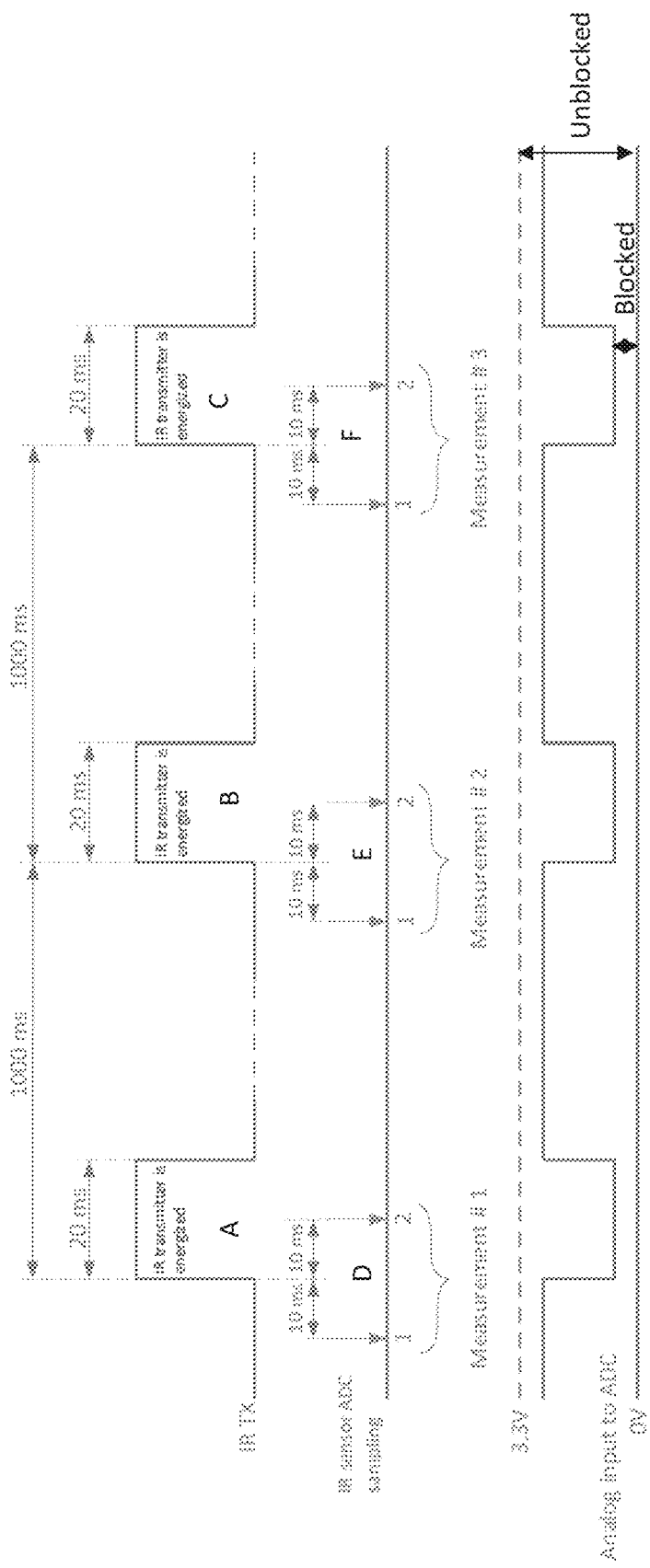
FIG. 5A is a diagram showing an IR signal activation and listening methodology in accordance with one embodiment of the invention.

FIG. 5A shows representative IR sensor measurement timing based on 3 activation and measurement sequences. The IR transmitter is activated at time 0 (A) for a period of time (e.g. 20 ms or less) and reactivated at 1 second intervals (B and C). The IR sensor system is activated to listen for the transmitted signal at −10 to +10 ms relative to time 0 (D) (and subsequent times E and F) through the analog digital converter (ADC). The average difference for each measurement may be averaged to determine IR sensor Boolean status where if the average difference is less than a threshold, the signal is considered unbroken and if it is above the threshold, it is considered broken.

In a typical deployment, the fill level status would typically be measured at rate of 1-4 measurements per day.

Measured data is stored in the MCU until reported by the communication system to a local and/or wide area network.

Mechanical Design

Generally, each SM will be designed for SCs of a known size and thus the physical dimensions of the SC will be standard allowing the SM to be built to accommodate that standard size. However, as manufacturers adjust their products over time, variations in SCs may be seen with the result that SMs may be too small or too large for a SC believed to be of a standard size. Hence, in various embodiments, the emitter/receivers may be adjusted relative to the sides of the SC to accommodate different sized SCs. In one embodiment, a biasing system such as springs S (shown schematically in FIG. 6) may be incorporated between the side walls 1b, 1c of the SM and each of the emitter 5 and receiver 6 to push the emitter and receiver towards one another against the outer surfaces of the SC. The biasing system may further include an alignment system to ensure that emitter/receiver pair remain aligned.

In one embodiment, the emitters/receivers may also be adjusted vertically (shown by arrows V) to allow a customer/service company to adjust the desired levels for partially full or full signals.

Figure 6:
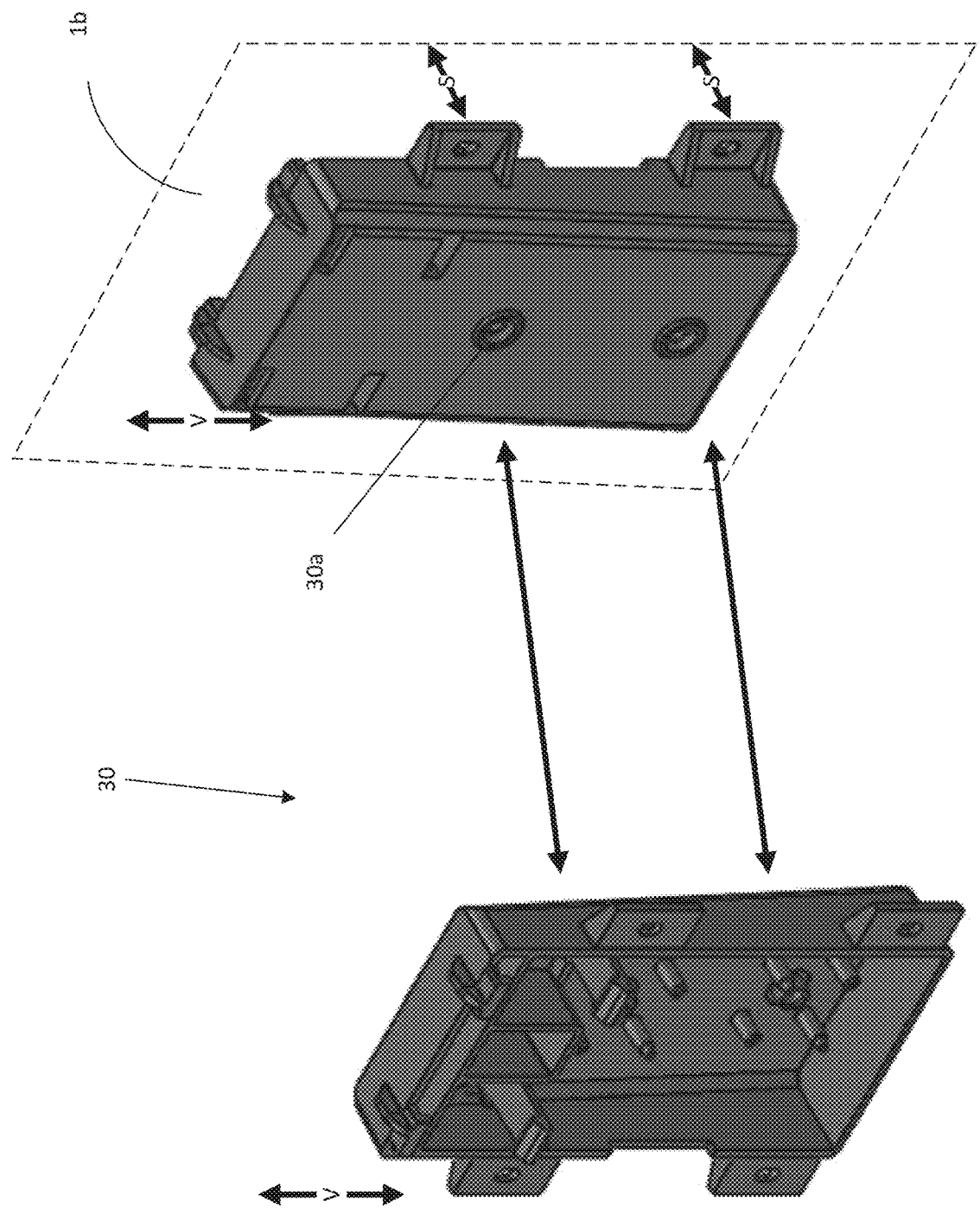
FIG. 6 is a perspective view of an emitter/receiver pair in accordance with one embodiment of the invention.

FIG. 6 shows a mounting system and housing 30 for a system having two emitter/receiver pairs allowing fill level measurement at two levels. The emitters/receivers are recessed within openings 30a within the housing at a level that provides a desired beam width to ensure in the case of the emitter that the emitted beam is within the correct range to be received by the receiver, to minimize ambient light leaking into the opening that could affect or cause additional variations in ambient light conditions and to provide protection to the emitter/receiver pair. Each housing will further contain the appropriate PCBs for each emitter and receiver.

Figure 7:
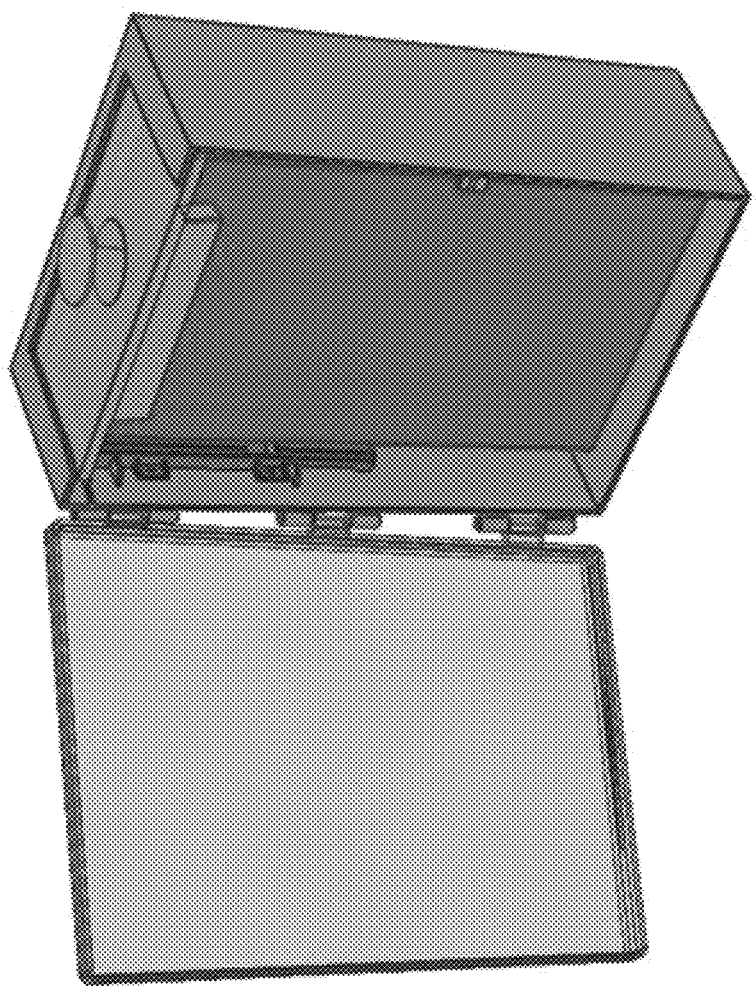
FIG. 7 is a perspective view of an assembled sharps monitoring system (SM) and sharps container (SC) in accordance with one embodiment of the invention.
Figure 7A:
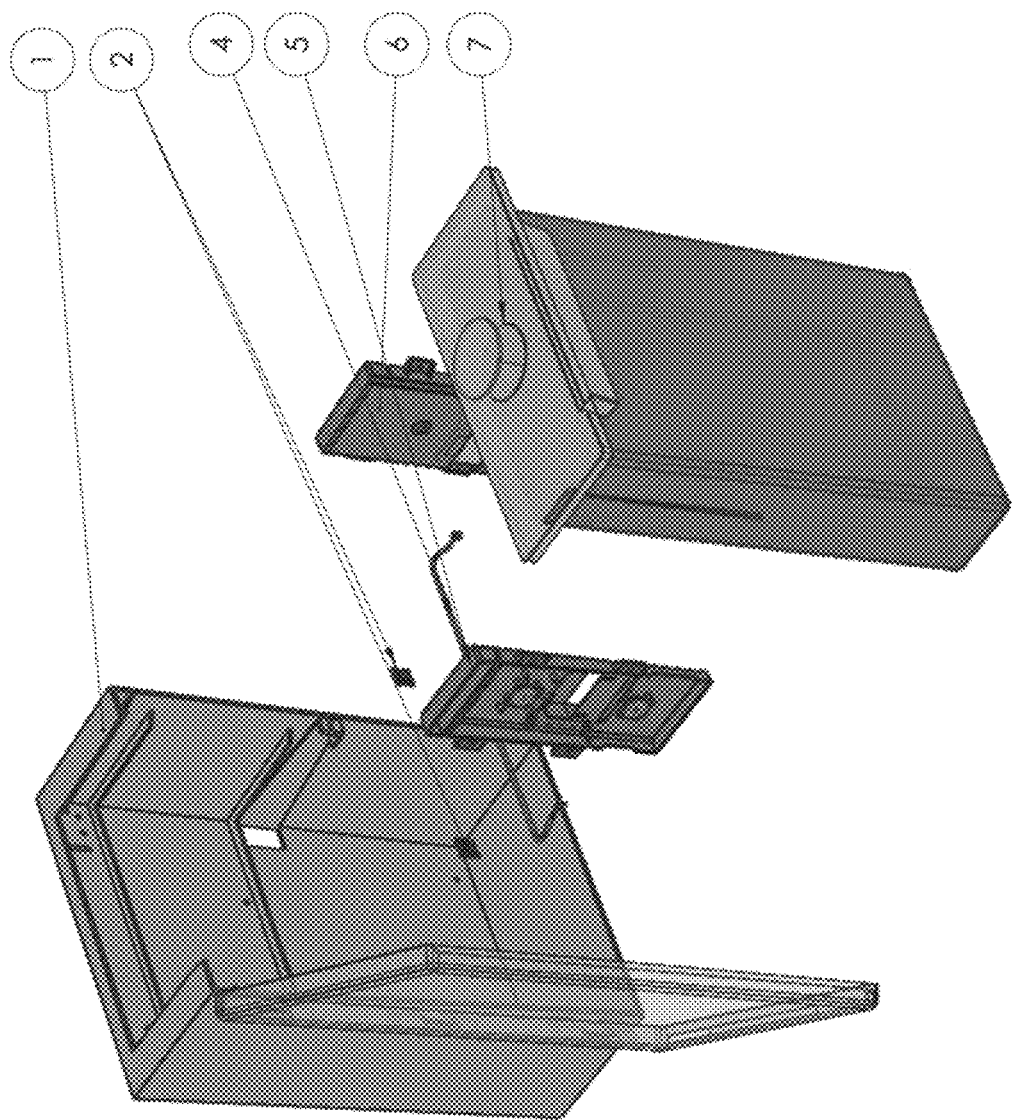
FIG. 7A is a perspective view of an exploded sharps monitoring system (SM) and sharps container (SC) in accordance with one embodiment of the invention.

FIGS. 7 and 7A show another design for a different SC where the SC is secured within a locking cabinet with a clear door that allows clear visual identification of the contents of the cabinet.

Operation

With successful collection of fill level data and with various communication protocols, multiple levels of functionality can be provided to different users.

At a basic level, knowledge of the time and date that an SC has reached one or more fill levels allows users to make servicing decisions in a timely and efficient manner. If multiple fill levels are being monitored, knowledge of the time and date that an SC was installed (i.e. empty) and subsequent measurement of a partial fill level (e.g. 50%) on a particular day enables calculation of a rate of fill. Further measurement to confirm a higher fill level (e.g. 80%) can be used to trigger a service call but also to confirm/adjust a rate-of-fill. Knowledge of the rate-of-fill can be used by institutions/service companies to monitor SC usage and enable planning service schedules and/or to modify the size of containers in certain locations.

In one embodiment, namely a SM having only a short-range communication system (e.g. Bluetooth™ or Bluetooth™ Low Energy (BLE)), each SM can communicate with nearby handheld personal computing devices 52 that may be carried by servicing personnel. In these embodiments, servicing personnel 60 may walk through a location where multiple SC/SMs are deployed carrying a portable computing device with application software and without entering individual rooms can be provided with current fill status of nearby systems 11. If a system has reached a threshold fill level, service may be provided immediately if the level reported is a full-level or a location may be ignored if the level is a partial-fill level. Importantly, this can substantially reduce the time required to service a particular location as the distance walked by servicing personnel may be reduced as entering individual rooms to visually check on a specific SC is not required. Importantly, relevant information can be received without entering a treatment room and thus if a room is being used, interruptions can be avoided particularly if a SC does not require servicing. If a room is being used and servicing is required, facility-specific protocols may be followed. As noted above, data may also be reported to central computer systems directly and/or via gateway devices and only be received at a PCD from the central computer system.

Power Consumption

Preferably, in the case of systems having wide area network communication capabilities, fill level data is reported relatively infrequently (e.g. twice per day) but at a level that provides an appropriate level of granularity of data to make meaningful and accurate servicing decisions. Accordingly, to the extent that power consumption is reduced, longer intervals between changing batteries in a SM can be achieved which reduces overall operational costs of the system. In some embodiments, the power system may include solar cells that may substantially increase the time between battery servicing events.

Communication

As noted above, communication may be multi-faceted depending on desired functionality. In one embodiment, in the case of larger hospitals where servicing is generally conducted on a regular basis, each SM may communicate via BLE to a PCD application when service personnel are in range. In this embodiment, data stored within the SM is transmitted to the PCD based on a data request instruction being received from the portable device, the request instruction only being triggered by a nearby portable device. Preferably, in this embodiment, the system operates independently of any networks within the hospital/facility.

In other embodiments, as introduced above, wide-area network communication can be provided and incorporate various low-cost data systems and protocols to enable small data packets to be delivered to a central computer system. Such protocols may include LTE-M, NB IOT cellular communication, LORAWAN communication or other sub-GHz communication. Decisions of the most appropriate communication protocols/equipment may be determined by the use case, including parameters such as the number of containers on site and how containers are clustered on site.

User Display

Various user displays may be incorporated within the SM that provide useful information to different users. For example, a green, yellow and red light system may provide information indicating fill levels to users where green indicates a low level (e.g. less than 50% full), yellow a high fill level (e.g. >50%-80%) and a red full level (e.g. greater than 80%). As sensor power consumption may be affected by such auxiliary functions, such displays may be configured to auxiliary power supplies including separate battery systems and/or solar cells. Such systems may also include motion sensors that activate the indicators only when personnel are detected nearby (e.g. within 1 m of the SM).

Other sensors such as a tamper sensor may be incorporated.

Microcontroller/Processor

In various embodiments, the processor 6e is generally configured to conduct various combinations of the following when various sensors are part of the system:

Receive fill level information from the fill measurement sensor(s) to determine if the predetermined fill levels of the container have been reached.

Receive data from anti-tampering sensors if equipped.

Receive power data from the power supply.

Receive communication data from the communication system and provide container time, fill status and other data to the communication system.

Provide output data to the user display.

Functionality that may be provided at the central computer system may include calculating a rate of change of fill and projected fill date to assist in serving scheduling.

Transmission Spectrum

The effectiveness of emitting and receiving light through the plastic walls of different SCs was tested.

It was determined that for polyolefin plastic containers the optimal light wavelength in the range of 900-950 nm provided the best results.

Various factors including variations in wall thickness of containers and the width of the emission beam can affect the accuracy of the signals. Generally, variations in wall thickness can be adjusted for by baseline calibration and an emission beam having a view angle less than about 20 degrees is preferred.

Operational Overview

In systems where fill level data is reported to a central computer system 50, the central system can deliver appropriate data to a service company in order to deploy servicing personnel based on the overall knowledge of the status of multiple SC/SM systems at a particular institution and/or across multiple locations.

In one embodiment, each SM is only capable of remote/wide-area reporting. For example, the SM may be configured with a LORAWAN communications system wherein fill and time data is only reported to a central system via a cellular network. Such a network may include locally installed gateway devices 53 as shown in FIG. 3A or each device 11 may communicate directly to the cellular network. In this case, a service company/customer can receive a daily report from the central system that provides data regarding individual SMs and whether they require service or not. Based on the report service personnel may be deployed to a location and with the PCD be aware based on data received from the central system of the specific SMs on a floor or within a building requiring service. Thus, data may be not be "real-time" but will likely be based on data received within the previous 24 hours.

More specifically, service personnel may receive a report indicating for example that 10 of 50 SCs on the 4th floor of a hospital require service which is accessed and displayed on a PCD. The report will preferably include a recommended servicing sequence for that particular floor as shown representatively in Table 1. Other data as described below may also be reported to the service personnel.

TABLE 1

Representative Servicing Sequence Report
4th Floor-Children's Hospital

| Recommended Service Order | Sharps Container ID # | Location | Last Service | Fill Status | Other | Service Completed | Notes |
|---|---|---|---|---|---|---|---|
| 1 | 1500 | Room 401 | 1 May 2021 | Requires service | BAT Low | Yes | >95% |
|   | 1501 | Room 402 | 1 May 2021 | Does not require service |   |   |   |
|   | 1502 | Room 404 | 1 May 2021 | Does not require service |   |   |   |
| 2 | 1504 | Ward 415 | 15 Jan. 2021 | Require Service | Max Time | Yes | 80% |
| n | ... 1575 | Treatment Room 450 | 15 Jan. 2021 | Requires Service |   | Underway |   |

As shown in Table 1, compiled data from a number of SMs at a particular location may be presented to service personnel with information regarding the status of individual SCs at a location, the specific location of the SC, and a recommended service order. Other information may include the date of the last service and/or battery status information and/or maximum time information as explained below. In addition, the PCD may allow the service personnel to provide confirmation of completion of service and observations of the service personnel about the SC/SM.

Generally, each SM will include hardware/software to support servicing procedures. For example, when reporting data to a PCD, the PCD will preferably display an ID #, a location nickname (e.g. a room #), fill status (e.g. green, yellow, red or number), maximum time (e.g. green, red), and battery status (e.g. good or service required).

In one embodiment, the SM will advertise its existence at regular frequency (e.g. once per second) and have an RF range of approximately 15-30 m. In another embodiment, the SM will not use BLE but use LORAWAN to communicate its status to the LORAWAN gateway.

In one embodiment utilizing BLE, when a user is walking through an area where multiple SMs are located, the PCD will be running application software and be searching for SMs. When a SM is found, the application software will request status data which will trigger transmission of the SM status data to the PCD. Different reporting parameters may be implemented including reporting only data from SMs that require servicing or all SMs within range as examples.

Other data that may be useful to the CCS that can in turn be reported to a facility/service company is fill-rate data and-time-to-empty-after-full-status data both of which can be helpful for planning servicing.

Maximum time is a parameter that may be included that indicates a maximum time between servicing regardless of fill status. For example, a maximum fill time of 90 days may be set that is a trigger to service the SC regardless of the fill level. Thus, for example, servicing personnel may be shown an indicator that the maximum fill time is not exceeded (e.g. green) indicating that if the fill level is not full, servicing is not required or that the maximum fill time is exceeded (e.g. red) indicating that the SC must be serviced irrespective of its fill status.

Proof of service information may be entered into the application software. For example, a QR code (or similar code) may be positioned on the back side of the SC whereupon removal of the SC from the SM, the QR code can be scanned as a full container and an empty SC then scanned prior to connection to the SM, thus confirming the key steps of a service. Each of these steps can include time stamps to provide baseline information about the time and date of an empty container for the purposes of calculating rate-of-fill and for chain-of-custody information for full containers.

A facility may also be mapped out for display on a PCD. For example, a floor plan as shown in FIG. 3 may be presented on a PCD together with the location of all SC/SMs on that floor with markers indicating which require service. In addition, if location data of each SC is mapped, the system may further calculate a minimum distance between SCs requiring service in order to derive a minimum or recommended order for servicing. Generally, to provide meaningful information, two or more SCs would require servicing at a location (with a fixed starting point) in order to provide a recommended order.

Other Features

In practice, as sharps are dropped into a SC, the upper surface of the used sharps may be uneven whereby one or more sharps have fallen in a substantially vertical orientation that results in blockage of the measuring beam. As can be appreciated, a single sharp in this orientation could provide a false full signal resulting in an unnecessary or premature service call. As such, the system can be modified to reduce the likelihood of false full signals.

For example, as sharps can include translucent plastic syringe barrels, increasing the power of the emitter upon receiving a full/blocked signal may provide sufficient power for the signal to be received through a sharp. That is, if a full signal is received, as a check, the system may make one or more additional measurements at a higher power to potentially determine if the full signal is valid.

Similarly, in the event that a full signal is received, the protocol for initiating a service call, may be to have the full signal to be confirmed with one or more regularly timed measurements. That is, on a given day, an errant sharp may have produced a false full signal, but over the course of a day, as additional sharps are dropped on the errant sharp, the errant sharp may be hit and fall to a lower position. While not guaranteeing that false full signals will not result in premature service calls, this can decrease the frequency of receiving such signals.

In other embodiments, the emitter beam may be widened and/or a receiver capable of seeing a broader beam may be incorporated and/or two or more receivers may be incorporated that will similarly lower the likelihood that an errant sharp blocks the beam.

Figure 8:
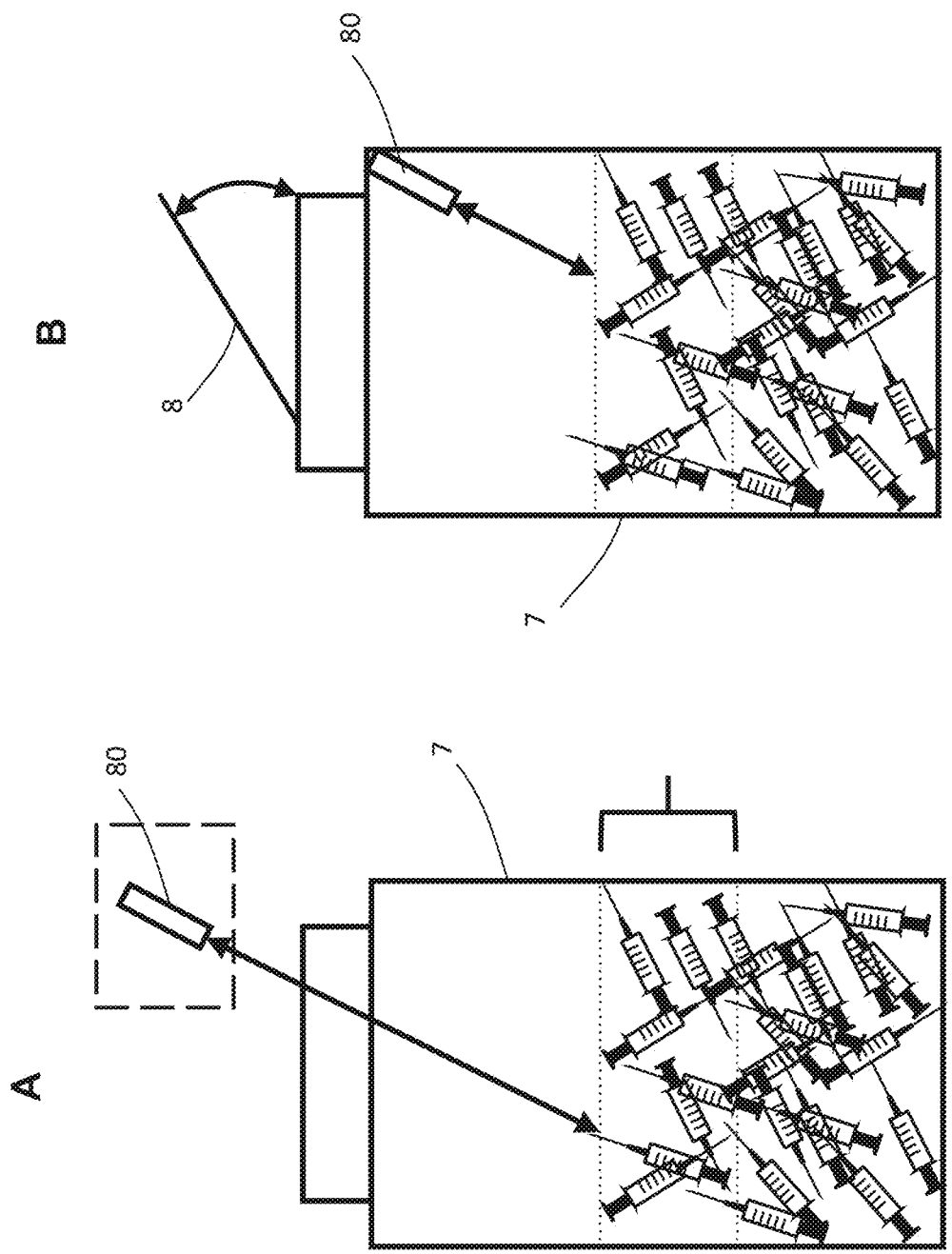
FIGS. 8 (A) and (B) are sketches of alternative embodiments of a sharps monitoring system incorporating a time of flight sensor.

In one embodiment, as shown in FIG. 8, the SM includes a time of flight (TOF) sensor that measures the distance between an emitter and the top surface of the sharps by reflecting light off the sharps and determining distance based on a time difference between emission and reception. In this case, it is generally preferred that the TOF sensor does not require modification of a SC to enable measurement; however, a TOF sensor may also be incorporated into different SCs where modification of the SC is required.

As shown in FIG. 8, two embodiments are shown and described. In a first embodiment A, the TOF sensor 80 is incorporated into the SM and modification of the SC is not required. This embodiment may be enabled when the design of the SC has a clear line of sight from above the SC into the SC. For example, this may be possible if the design of the SC does not have a closeable lid and has a relatively large and/or long opening that allows a TOF sensor to be positioned on the SM where the TOF can see the inside the SC at all times.

In situations as shown in FIG. 8(B), where the SC has an openable lid 8, while it may be possible to take a level reading when the lid is opened, this will usually not be practical.

However, a TOF sensor may be configured within the SC to take readings from within the SC. As incorporating a TOF sensor within a SC may require modification of the SC as well as complicating cleaning, if a TOF sensor is configured within the SC, the TOF sensor will preferably be removable (partially or fully) from the SC at the time of opening the SC for emptying and cleaning. In some embodiments, the TOF sensor may be disposable and in some embodiments the TOF sensor may be cleanable.

In one embodiment, the TOF sensor includes at least one set of leads to penetrate the SC to allow the TOF sensor to be connected to the SM electronics.

In various embodiments, the TOF sensor is selectively attached to the inside of the SC and includes an inductive coil to transmit power and data through a wall/lid of the SC to the SM processor. In this embodiment, no modification of the SC is required and the TOF sensor can be fully retrofit to almost all SCs. The TOF may be attached to the inside of the SC by various connection techniques that may require varying degrees of personnel involvement at the time of servicing or assembly of the SC lid with the SC body. For example, in various embodiments, the TOF sensor is attached to the inside of the SC using an adhesive/tape such as two-sided tape or a hook and clasp fastener (e.g. Velcro™) and/or a clip system for attaching the TOF sensor to a lid. In one embodiment, as shown in FIG. 9, a first magnet 81a is configured to the TOF sensor 80 and a second magnet 81b is aligned on an outer surface to hold the first magnet in place. The magnets each include a power and data transmission assembly (not shown) to transmit power and data through the SC. The outer power and data transmission assembly is preferably connected to the SM processor by electrical leads 81c that are connected/disconnected by the service personnel at the time a new SC is placed within or removed from the SM.

In one embodiment, the TOF sensor 80 includes an independent power supply and the coupling system does not require power transmission through the SC.

In these embodiments, at the time the SC is opened for cleaning, the TOF sensor is removed from the SC for independent cleaning. Similarly, after cleaning, the TOF sensor is connected to the SC and transported to a SM for connection at the time of servicing.

Importantly, a TOF sensor can provide advantages over other sensors in that a TOF sensor can obtain data for all fill levels instead of discrete levels. This can enhance the ability of the customer to customize threshold levels and in particular will provide greater accuracy in calculating rate of fill.

TOF sensors may include ultrasound, IR laser and lidar sensors.

The invention claimed is:

1. A system for monitoring a fill level of a sharps container (SC) having first and second side walls and for reporting fill level data to a computer system, the system comprising:
   a sharps monitor (SM), the SM having a body configured to hold and secure the SC within the body, the body having side walls supporting an emitter/receiver pair including:
   the emitter for emitting light through the first side wall of the sharps container;
   the receiver for receiving light through the second side wall of the sharps container;
   a processor and memory configured to the body for receiving and storing fill status data from the receiver;
   a communication system connected to the processor and memory for communicating fill data to a computer system over a wireless communication network; and
   a portable computing device (PCD) where the processor reports to the PCD a combination of fill status data and device location data where the PCD displays a map of a facility and nearby SMs based on a distance threshold between one or more of the nearby SMs and the PCD.

2. The system as in claim 1 where the emitter is an 900-950 nm LED.

3. The system as in claim 1 where the emitter/receiver pair comprise an emitter housing supporting the emitter and a receiver housing supporting the receiver and where the receiver is recessed within the receiver housing to partially shield the receiver from ambient light.

4. The system as in claim 3 where the emitter and receiver housings contact the sharps container when a sharps container is mounted in the body.

5. The system as in claim 1 where the processor is configured to initially activate the receiver to obtain an ambient light reading and subsequently activating the emitter and receiver to take a fill level reading.

6. The system as in claim 5, wherein based on a difference between the ambient light reading and fill level reading determines when an emitted signal from the emitter is blocked or unblocked.

7. The system as in claim 1 where the communication system is configured for local area network communication with the PCD and the processor advertises a device presence to initiate communication and data reporting from the device to the PCD.

8. The system as in claim 1 further comprising the SC, the SC having a code configured to the SC and where the code is only visible to a user upon separation of the SC from the device.

9. The system as in claim 8 where the application software is configured to receive the code from a full SC upon separation of the full SC from the SM.

10. The system as in claim 9 where the application software is configured to receive a code on an empty SC prior to connecting the empty SC to the SM.

11. The system as in claim 1 where the application software is configured to receive SM battery status data from the SM and prompt to replace a SM battery when a battery level is below a pre-determined threshold.

12. The system as in claim 1 where the SM includes a first emitter/receiver pair configured to read an 80% fill level of an SC and a second emitter/receiver pair configured to read a 50% fill level of the SC.

13. The system as in claim 1 where the communication system includes a wide area network communication system for wireless connecting the SM to a wide area network and where the system further comprises a central computer system (CCS) configured with CCS application software to receive fill status data and location data directly from the SM.

14. The system as in claim 1 where the PCD is configured with application software configured to wirelessly connect to the SM and receive fill status data and device location data.

15. The system as in claim 14 where the application software is configured to display a maximum time status and where the maximum time status is one of maximum time status not exceeded or maximum time status is exceeded.

16. The system as in claim 1 where the application software is configured to display fill status data of the SC and display when the SC requires servicing or not based on reported fill status data.

17. A method of obtaining and reporting fill status data from a plurality of sharps containers (SC) in a location, the SCs configured for wide area network communication with a central computer system (CCS), the method comprising the steps of:
   a. reporting fill status data from one or more SCs at the location to the CCS;
   b. deriving a location service report for the location based on a fill status of each SC at the location where each SC is marked as requiring service or not requiring service based on a reported fill status; and
   c. delivering the location service report to a portable communication device (PCD) carried by a user where the location service report includes location specific information for each SC requiring service at the location and the PCD displays a map of a facility and nearby SCs based on a distance threshold between one or more of the nearby SCs and the PCD.

18. The method as in claim 17 further comprising the step of deriving a recommended service order for two or more SCs marked as requiring service at a location based on a minimum distance between SCs at a location and displaying the recommended service order to the user.

19. A system for monitoring a fill level of a sharps container (SC) having first and second side walls and for reporting fill level data to a computer system, the system comprising:
   a sharps monitor (SM), the SM having a body configured to hold and secure the SC within the body, the body having side walls;
   a time of flight sensor configured to the SM or SC having a line of sight towards an inside bottom surface of the SC for measuring a fill level of sharps within the SC;
   a processor and memory configured to the body for receiving and storing fill status data from the receiver;
   a communication system connected to the processor and memory for communicating fill data to a computer system over a wireless communication network; and
   a portable computing device (PCD) and where the processor reports to the PCD a combination of fill status data and device location data where the PCD displays a map of a facility and nearby SMs based on a distance threshold between one or more of the nearby SCs and the PCD.

20. The system as in claim 19 where the time of flight sensor is connected to an interior of the SC and is removeable from the SC for cleaning the SC.

21. The system as in claim 20 where the time of flight sensor is selectively connected to the SC and includes a power and data transmission system for transmitting power and data through the SC via an inductive power and data system.

22. The system as in claim 21 where the power and data transmission system includes a first inside magnet and a second outside magnet and where the first and second magnets collectively secure the time of flight sensor within the SC.

* * * * *